United States Patent
Grohmann et al.

(10) Patent No.: US 9,484,843 B2
(45) Date of Patent: Nov. 1, 2016

(54) ELECTRIC CIRCUIT WITH POWER AMPLIFIER FOR PIEZOELECTRIC ACTUATORS

(71) Applicants: AIRBUS HELICOPTERS DEUTSCHLAND GMBH, Donauworth (DE); EADS DEUTSCHLAND GMBH, Ottobrunn (DE)

(72) Inventors: Boris Grohmann, Bouc Bel Air (FR); Stefan Storm, Unterschleissheim (DE)

(73) Assignees: Airbus Helicopters Deutschland GMBH, Donauworth (DE); EADS Deutschland GMBH, Ottobrunn (DE)

( * ) Notice: Subject to any disclaimer, the term of this patent is extended or adjusted under 35 U.S.C. 154(b) by 436 days.

(21) Appl. No.: 14/067,148

(22) Filed: Oct. 30, 2013

(65) Prior Publication Data
US 2014/0132113 A1    May 15, 2014

(30) Foreign Application Priority Data
Nov. 14, 2012    (EP) .................................... 12400047

(51) Int. Cl.
*H01L 41/09* (2006.01)
*H02N 2/06* (2006.01)
*B64C 27/00* (2006.01)
*B64C 27/72* (2006.01)

(52) U.S. Cl.
CPC ............. *H02N 2/065* (2013.01); *B64C 27/001* (2013.01); *B64C 2027/7283* (2013.01); *Y02T 50/34* (2013.01)

(58) Field of Classification Search
USPC ................................................. 310/314–319
See application file for complete search history.

(56) References Cited

U.S. PATENT DOCUMENTS

| | | | |
|---|---|---|---|
| 3,963,372 A | 6/1976 | McLain | |
| 6,411,009 B2 * | 6/2002 | Jaenker | H02N 2/065 310/316.01 |
| 6,703,762 B1 * | 3/2004 | Okada | H02N 2/0025 310/317 |

(Continued)

FOREIGN PATENT DOCUMENTS

| | | |
|---|---|---|
| DE | 10321705 | 12/2004 |
| FR | 2933910 A1 | 1/2010 |

OTHER PUBLICATIONS

Search Report and Written Opinion; Application No. FR 1203181; dated Jun. 19, 2013.

(Continued)

*Primary Examiner* — Thomas Dougherty
(74) *Attorney, Agent, or Firm* — Brooks Kushman P.C.

(57) ABSTRACT

An electric circuit with one power amplifier (V1) for at least two piezoelectric actuators (C1, C2), said piezoelectric actuators (C1, C2) being in preferably antagonist arrangement connected mechanically in series and being connected electrically with each other and operated or clocked by a control circuit, such as a pulse modulator circuit, for time-variant energizing of the piezoelectric actuators (C1, C2) in push-pull fashion, said power amplifier (V1) being connected to a junction point between the two piezoelectric actuators (C1, C2), characterized in that said power amplifier (V1) is connected to a one directional diode (D1) and in that two buffer capacitors (C3, C4) and two static resistors (R3, R4) are provided downstream the one directional diode (D1) with regard to the power amplifier (V1).

6 Claims, 1 Drawing Sheet

(56) References Cited

U.S. PATENT DOCUMENTS

| | | |
|---|---|---|
| 8,283,796 B2 | 10/2012 | Certain |
| 2005/0280332 A1 | 12/2005 | Ollila |
| 2005/0285477 A1 | 12/2005 | Ollila |
| 2006/0267523 A1 | 11/2006 | Seelig et al. |
| 2008/0316671 A1 | 12/2008 | Kakehi |
| 2009/0186320 A1 | 7/2009 | Rucci |
| 2009/0189453 A1* | 7/2009 | Kitazawa ............... B41J 2/0452 307/71 |

OTHER PUBLICATIONS

Bilgen et al. Journal of Intelligent Materials Systems and Structures Sep. 2010, vol. 21, No. 14, pp. 1417-1726, XP 009168242, "Lightweight High Voltage Electronic Circuits for Piezoelectric Composite Actuators".

European Search Report for European Application No. EP 12400047, Completed by the European Patent Office on Mar. 22, 2013, 6 Pages.

* cited by examiner

ELECTRIC CIRCUIT WITH POWER AMPLIFIER FOR PIEZOELECTRIC ACTUATORS

CROSS REFERENCE TO RELATED APPLICATION

This application claims priority to European patent application No. 12 400047.2 filed Nov. 14, 2012, the disclosure of which is incorporated in its entirety by reference herein.

BACKGROUND OF THE INVENTION (1) Field of the Invention

The invention is related to an electric circuit with one power amplifier for two piezoelectric actuators and said invention particularly belongs to the field of power electronics for piezoelectric actuators, in particular for helicopters.

(2) Description of Related Art

Piezoelectric actuators have the advantage of a high actuating precision and a fast reaction. Piezoelectric actuators are components with a high electrical capacity whereby only part of the electrical energy supplied to the actuators is converted to mechanical energy. A large part of this energy is stored in the piezoelectric actuator functioning as a capacitor.

In a dynamic, repetitious or continuous operation of a piezoelectric actuator, considerable electrical power in the form of apparent power flows through the actuator. This apparent electrical power has to be supplied by the driver circuit of the actuator. In the case of periodic driving or energizing the piezoelectric actuator is electrically alternately charged and discharged, whereby electrical energy is cyclically supplied to and withdrawn from the piezoelectric actuator. In known driver circuits for periodic or repetitious driving of the piezoelectric actuator, the stored electrical energy is dissipated during the discharge phase or cycle in the driver or control circuit which has for example an ohmic resistance for the dissipation.

The document US 2008/0316671 A1 discloses a piezoelectric actuator with an amplifier for a piezo arrangement based on pulse-width modulation (PWM) using switches SW in combination with inductors L. The inductors are used as low pass filters to buffer energy at high frequency of PWM, e.g. in the order of 20 kHz. A detailed PWM generation scheme is disclosed with independent charging and discharging circuits. Only unipolar operation is possible.

The document US 2005/0285477 A1 discloses two piezo-elements which are driven with two voltages having a phase difference. One of the piezo-elements is charged by an inductive step-up means to a voltage exceeding an available power supply voltage. Subsequent charge, i.e. energy is transferred from the one piezo-element to the other piezo-element by an inductive element. Only unipolar operation is possible.

The document US 2005/0280332 A1 discloses two piezo-elements of a piezoelectric actuator which are driven with two voltages having a mutual phase difference. One of said piezo-elements is charged by a capacitive voltage step-up means to a voltage exceeding an available power supply voltage. A capacitor is coupled to the piezo-element, which divides the voltage of the piezo-element and simultaneously transfers part of the energy stored in the piezo-element to said capacitor. A part of the energy transferred to said capacitor is later transferred back to said piezo-element, providing an energy-saving feature. The second piezo-element is driven in a similar way providing the required phase difference. According to US 2005/0285477 A1 and US 2005/0280332 A1 there are respectively 2 amplifiers for 2 piezo-elements.

The document U.S. Pat. No. 6,411,009 A discloses a piezoelectric actuator with at least two piezoelectric actuator elements connected in series with each other mechanically and electrically. Said two piezoelectric actuator elements form a half bridge in an amplifier bridge circuit having a further half bridge formed by two series connected electronic switches which are operated or clocked by a control circuit such as a pulse modulator circuit for periodically energizing the piezoelectric actuators in push-pull fashion.

A choke is connected between a first junction point of the two piezoelectric actuators and a second junction point between the two electronic switches for assuring a loss free reverse charging of the two piezoelectric actuators functioning as electrical capacitors in the energizing bridge circuit. The choke functions as energy storage and the stored energy is used in the push-pull charging of the capacitors formed by the piezoelectric elements. The choke is used as low-pass filter to suppress the oscillations of a pulse width modulator generated by two switches driving the two piezoelectric actuator elements. The piezoelectric actuator according to U.S. Pat. No. 6,411,009 A allows only unipolar operation.

BRIEF SUMMARY OF THE INVENTION

The objective of the present invention is to provide a simple and reliable electric circuit for two piezoelectric actuators adapted to an actuation frequency from 7 Hz to 35 Hz or even 42 Hz and with an energy storage.

The solution is provided with an electric circuit for two piezoelectric actuators with the features of claim 1. Preferred embodiments of the invention are provided with the features of the subclaims.

According to the invention an electric circuit with one power amplifier for at least two or any even number of piezoelectric actuators is provided. Said at least two or any even number of piezoelectric actuators are in preferably antagonist arrangement connected mechanically in series with each other. Said at least two or any even number of piezoelectric actuators are interconnected as well electrically with each other through a first junction point between two first terminals of the piezoelectric actuators and operated by one power amplifier, said one power amplifier being commanded by a control circuit for time-variant energizing the at least two or any even number of piezoelectric actuators respectively in push-pull fashion. Said power amplifier has a first terminal which is grounded and a second terminal connected to the first junction point between the first terminals of the piezoelectric actuators.

The electrical circuit comprises a one-directional diode whose anode is connected to the first junction point and therefore to the second terminal of the power amplifier and to the first terminals of the at least two piezoelectric actuators. The cathode of the diode is connected to a second junction point to which a first terminal of a first buffer capacitor and a first terminal of a first static resistor, said first buffer capacitor and said first static resistor being connected in parallel to each other, are also connected.

The second terminal of the first buffer capacitor and the second terminal of the first static resistor are connected to a third junction point to which a first terminal of a second buffer capacitor and a first terminal of a second static resistor, said second buffer capacitor and said second static resistor being connected in parallel to each other, are also connected. The second terminal of the second buffer capacitor and the second terminal of the second static resistor are grounded.

The third junction point is also connected to a first terminal of an at least one protection resistor, whose second terminal is connected to the second terminal of the at least one piezoelectric actuator, with the second terminal of the at least other piezoelectric actuator being grounded.

According to an advantage of the inventive electric circuit the at least one buffer capacitor buffers preferably the blind power from the piezoelectric actuators which corresponds to charging and discharging of the capacitance of said piezoelectric actuators at "power supply" level at a frequency of blind power corresponding to the frequency of actuation, e.g. in the order of 7 Hz to 35 Hz for four bladed rotors or up to 42 Hz for five bladed rotors. The inductances as used in the state of the art do not buffer energy at said low frequencies unless at the prize of too large inductances. The inventive electric circuit allows an option for bipolar operation of preferably two antagonist piezoelectric actuators.

According to a further advantage of the inventive electric circuit, its two piezoelectric actuators are driven by one power amplifier, two capacitors, two static resistors and a diode, i. e. passive components instead active components, namely amplifiers and/or complex voltage stabilizing feedback loops as disclosed in the state of the art. The inventive electric circuit is a less complex solution at lower weight and lower costs than the state of the art. There are minimal electrical loads at the piezoelectric actuators of the inventive electric circuit thanks to a self-adjusting offset voltage and only two cables from the amplifier to the piezoelectric actuators.

The invention allows economy with regard to mass, size and costs by using mainly passive components like resistors and capacitors instead of the inductances of the state of the art tending to be large and heavy. The inventive electric circuit simplifies the cabling, which is particularly advantageous for piezoelectric actuators arranged inside helicopter rotor blades. The inventive electric circuit is applicable for all piezoelectric actuators, in particular in the field of helicopters, especially if 2 piezoelectric actuators are working in antagonist fashion.

The inventive electric circuit can deal with nearly any power amplifier, including PWM technology and allows division of the voltage based on one single amplifier and to buffer fluctuating power by adding components around the amplifier namely at least one additional DC link capacitor and a voltage divider in order to be able to drive piezoelectric actuators in a preferably antagonist arrangement.

The inventive electric circuit of the invention allows bipolar operation and an improvement of the performance of the piezoelectric actuators, i.e., an improvement of 20% of the displacement possible to generate without doubling the complexity of power amplifiers as disclosed in the state of the art. The invention provides division of the voltage based on one single power amplifier for bipolar operation and to buffer fluctuating power resulting from charging and discharging of said at least two piezoelectric actuators.

The protection resistor is provided between the third junction point and at least one piezoelectric actuator to shield said piezoelectric actuators from any sudden jumps of electric power from the power amplifier, said jumps of electric power being an inherent risk for the mechanic operating ability of the a piezoelectric actuators as said sudden jumps of electric power may lead to an immediate failure of the piezoelectric actuator due to tensile stresses and resulting mechanical cracks causing a reliability problem for any system controlled by an electric circuit with piezoelectric actuators. According to the preferred embodiment of the invention a robust electric circuit at activation/deactivation operation is provided due to protection of the piezoelectric actuators by the at least one protection resistor.

According to a further preferred embodiment of the invention at least one further protection resistor is provided between said at least two piezoelectric actuators, that is, between the first junction point and the first terminal of one piezoelectric actuator. At the electric failure such as a short circuit of one of the at least two piezoelectric actuators acting against each other in antagonist arrangement the at least one further protection resistor attenuates propagation of any excessive electric power to the other piezoelectric actuator thus shielding said other piezoelectric actuator from any sudden jumps of electric power resulting from the short circuited piezoelectric actuator making the inventive electric circuit failure tolerant for any supposed electric failure of one of the at least two piezoelectric actuators.

According to the advantage resulting from said further preferred embodiment of the invention the failure of one of the at least two piezoelectric actuators is not leading to a failure propagation transmitted via the electrical network and the power amplifier to the other of the at least two piezoelectric actuators thus improving reliability of the system controlled by the inventive electric circuit with piezoelectric actuators and avoiding repair. According to the preferred embodiment of the invention a robust electric circuit is provided due to protection of the piezoelectric actuators from each other by the at least one further protection resistor in case of an electric failure of one of the at least two piezoelectric actuators.

According to a further preferred embodiment of the invention the time-variance of the power amplifier is based on pulse-width modulation (PWM) for less thermal losses.

According to a further preferred embodiment of the invention the two buffer capacitors are provided with a capacitance>>than the respective capacitances of said at least two piezoelectric actuators, i. e. a factor of 10~100 times, said respective capacitances of said at least two piezoelectric actuators being approximately equal.

According to a further preferred embodiment of the invention the protection resistors are provided with a resistance<<than the resistance of said two static resistors, i. e. a factor of 10~100 times. Said respective resistances of said protection resistance and said further protection resistance and of said two static resistors being approximately equal.

According to a preferred embodiment of the invention the inventive electric circuit is applied to helicopters, particularly to helicopter rotors with a frequency of actuation in the order of 7 Hz (1/rev) to 35 Hz (5/rev) for four bladed or 42 Hz (6/rev) for five bladed rotors.

BRIEF DESCRIPTION OF THE SEVERAL VIEWS OF THE DRAWINGS

A preferred embodiment of the invention is described with reference to the attached drawings.

DETAILED DESCRIPTION OF THE INVENTION

Figure 1:
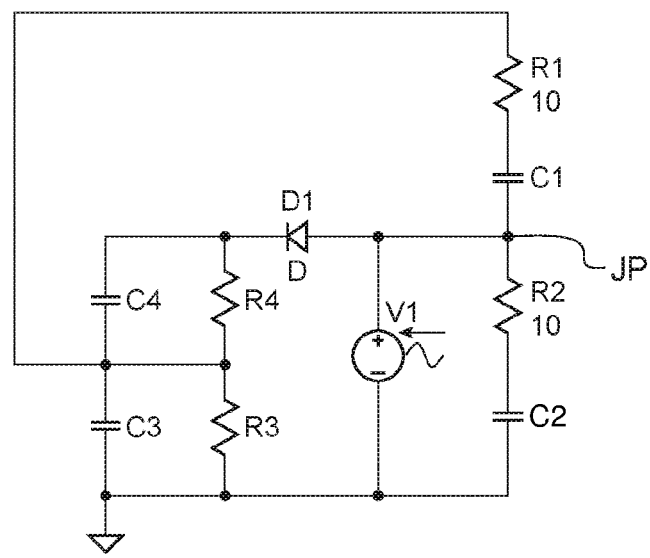
FIG. 1 shows a diagram of a preferred electric circuit according to the invention.

According to FIG. 1 an electric circuit comprises one power amplifier V1 for two piezoelectric actuators C1, C2.

The two piezoelectric actuators C1, C2 are in antagonist arrangement connected mechanically in series. The two piezoelectric actuators C1, C2 are connected electrically with each other. The respective capacitances of the two piezoelectric actuators C1, C2 are at least approximately equal. The antagonist arrangement facilitates pre-compression of the piezoelectric actuators in order to prevent tensile stresses potentially leading to mechanical cracks of the piezoelectric material and enhances the reaction of the two piezoelectric actuators C1, C2 if they are both loaded the same way and reduces correspondingly the reaction of the two piezoelectric actuators C1, C2 if they are both loaded with opposed charges.

The two piezoelectric actuators C1, C2 are operated by a power amplifier V1 linked to a control circuit. The control circuit commands for time-variant, particularly a sinusoidal signal, energizing of the power amplifier V1 and subsequently the piezoelectric actuators C1, C2 in push-pull fashion.

The power amplifier V1 is electrically connected to a first junction point JP of the electrical connection between the two piezoelectric actuators C1, C2. Downstream the one directional diode D1 with regard to the power amplifier V1 are provided two static resistors R3, R4 connected electrically in series and connected electrically parallel with regard to the power amplifier V1. Downstream the one directional diode D1 with regard to the power amplifier V1 are as well provided two buffer capacitors C3, C4 connected electrically in series and connected electrically parallel with regard to the two static resistors R3, R4 for provision of a voltage divider. Said respective capacitances of said two buffer capacitors C3, C4 are approximately equal. The resistances of said two static resistors R3, R4 are approximately equal.

An electrical connection is provided from between the two static resistors R3, R4 to in between said two buffer capacitors C3, C4 towards said piezoelectric actuator C1 via the protection resistor R1.

The approximately equal capacitances of said two buffer capacitors C3, C4 are>>than the respective capacitances of said two piezoelectric actuators C1, C2, i. e. C3, C4 22 >C1 or C2 with a factor of 10~100 times. The protection resistors R1, R2 are provided with respective resistances<<than the respectively approximately equal resistances of said two resistors R3, R4, i. e. a factor of 10~100 times.

Figure 2:
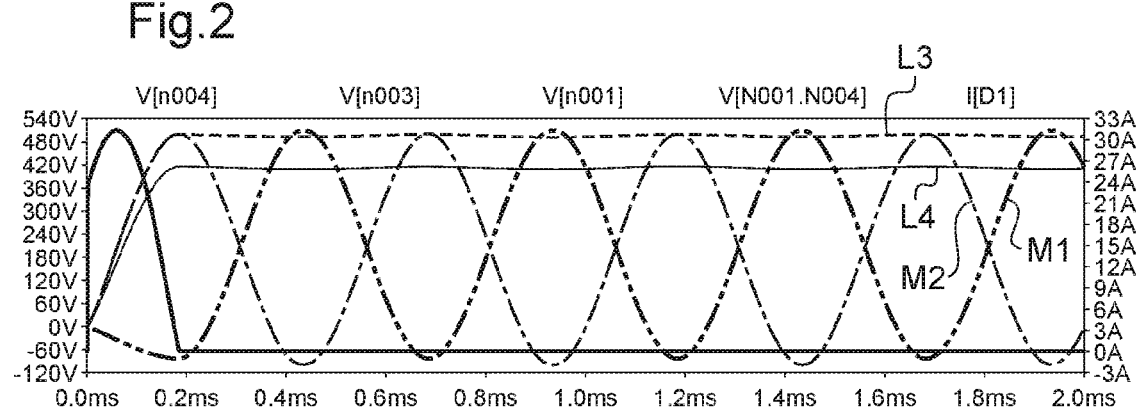
FIG. 2 shows a chart of detected voltages in the preferred electric circuit according to the invention.

According to FIG. 2 the electric voltage at C1 is provided with small distortions subsequent to fluctuations of the voltages/currents at C3 and C4 caused by discharging and charging of the respective capacitances of said two piezoelectric actuators C1, C2 and most of all of said two buffer capacitors C3, C4. Said small distortions are shown with the minor deviations from linearity of the respective voltage graphs L3 and L4. The respective voltage graphs L3 and L4 at said buffer capacitors C3, C4 result from addition of two voltage modulation sequences M1, M2, phase shifted with regard to each other, for time-variant energizing of the piezoelectric actuators (C1, C2) at the frequency of actuation in the order of 7 Hz to 35 Hz for four bladed rotors or up to 42 Hz for five bladed rotors.

The alternating positive and negative voltages/currents of the two modulation sequences M1, M2 reflect the bipolar operation of the electric circuit.

REFERENCE LIST

V1 power amplifier
C1 piezoelectric actuator
C2 piezoelectric actuator
JP first junction point
D1 one directional diode
C3 buffer capacitor
R1 protection resistor
R2 protection resistor
C4 buffer capacitor
R3 static resistor
R4 static resistor
L3 buffer voltage graph
L4 buffer voltage graph
M1 modulation sequence
M2 modulation sequence

The invention claimed is:

1. An electric circuit with one power amplifier for at least two piezoelectric actuators, the at least two piezoelectric actuators:
    being in antagonist arrangement connected mechanically in series and being connected electrically with each other through a first junction point between two first terminals of the piezoelectric actuators;
    being operated by the one power amplifier commanded by an input signal of a control circuit for time-variant energizing of the at least two piezoelectric actuators in push-pull fashion, the power amplifier having a first terminal which is grounded and a second terminal connected to the first junction point between such first terminals of the piezoelectric actuators;
    the electrical circuit further comprising a one-directional diode whose anode is connected to the first junction point and therefore to the second terminal of the power amplifier and to the first terminals of the at least two piezoelectric actuators;
    wherein:
        the cathode of the diode is connected to a second junction point to which a first terminal of a first buffer capacitor and a first terminal of a first static resistor, the first buffer capacitor and the first static resistor being connected in parallel to each other, are also connected;
        the second terminal of the first buffer capacitor and the second terminal of the first static resistor are connected to a third junction point to which a first terminal of a second buffer capacitor and a first terminal of a second static resistor, the second buffer capacitor and the second static resistor being connected in parallel to each other, are also connected;
        the second terminal of the second buffer capacitor and the second terminal of the second static resistor are grounded;
        the third junction point is also connected to a first terminal of an at least one protection resistor, whose second terminal is connected to the second terminal of a first one of the at least two piezoelectric actuators, with the second terminal of a second one of the at least two piezoelectric actuators being grounded.

2. The electric circuit according to claim 1, wherein at least one further protection resistor is provided between the first junction point and the first terminal of the second one of the at least two piezoelectric actuators.

3. The electric circuit according to claim 1, wherein the power amplifier is based on pulse-width modulation.

4. The electric circuit according to claim 1, wherein the buffers capacitors are provided with a capacity greater than the capacities of the at least two piezoelectric actuators, by a factor of 10~100 times, the capacities of the at least two piezoelectric actuators being equal.

5. The electric circuit according to claim 2, wherein the protection resistors are provided with respective resistances less than the respective resistances of the two static resistors, by a factor of 10~100 times.

6. An application of the electric circuit according to claim 1 to helicopters, particularly to helicopter rotors with a frequency of actuation in the order of 7 Hz(1/rev) to 35 Hz (5/rev) for four bladed or 42 Hz (6/rev) for five bladed rotors.

\* \* \* \* \*